United States Patent Office 3,824,269
Patented July 16, 1974

3,824,269
AMINOALKYLATION OF ALCOHOLS USING AN AZIRIDINE-SULFUR DIOXIDE COMPLEX
Donald A. Tomalia, James L. Brewbaker, and Narayanlal D. Ojha, Midland, Mich., assignors to The Dow Chemical Company, Midland, Mich.
No Drawing. Filed Feb. 26, 1970, Ser. No. 14,661
Int. Cl. C07c 137/00, 93/02
U.S. Cl. 260—456 A                     10 Claims

ABSTRACT OF THE DISCLOSURE

Alcohols are aminoalkylated in the novel process which comprises reacting (a) an alcohol with (b) a complex of an aziridine and sulfur dioxide. As an example, methanol reacts with a complex of aziridine and sulfur dioxide at 25° C. to produce an ammonium salt of 2-methoxyethylamine as the major product. The aminoalkylated products thus produced are easily converted to the corresponding free amino compounds by treatment with base. These compounds are useful, for example, as epoxy curing agents.

BACKGROUND OF THE INVENTION

Aziridine (ethylenimine) and substituted basic aziridines are typically unreactive with alcohols. The reaction between such compounds does occur, however, in the presence of strong acids, such as boron trifluoride, sulfuric acid and picric acid. This reaction is illustrated in "Ethylenimine and Other Aziridines" by O. C. Dermer and G. E. Ham, Academic Press, N.Y. (1969), pp. 224–26.

SUMMARY OF THE INVENTION

It has now been discovered that the class of compounds bearing one or more alcoholic hydroxyl groups, hereafter referred to as alcohols, can be 2-aminoalkylated in the novel process comprising reacting by contacting (a) an alcohol with (b) a molecular complex of an aziridine and sulfur dioxide. The products are obtained as novel ammonium salts which can be, if desired, easily converted to the corresponding free amine by treatment with base, such as aqueous caustic. The free amino compounds are useful as epoxy curing agents, acid scavengers, and other like utilities.

During the novel process, the hydrogen from the hydroxyl group is replaced with a 2-aminoalkyl group, e.g.

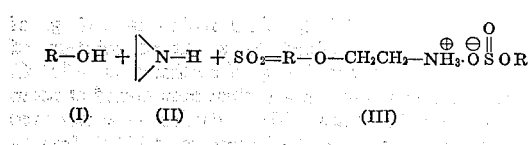

In the above, R—O— is the residue derived by removal of active hydrogen from an aliphatic alcohol. III may be further reacted with base to give R—O—CH₂CH₂—NH₂ (IV).

The subject process has several attendant advantages over the prior art processes. The major advantages are: (a) sulfur dioxide is a weak acid, making it less corrosive and easier to handle than prior art acids, (b) sulfur dioxide is volatile and easily removed from the product, (c) sulfur dioxide is substantially inert to the hydroxyl-bearing substrates, i.e. it does not degrade or decompose the substrate.

Aziridines

Suitable aziridine reactants in the process are basic (non-activated) aziridines, as defined by Dermer and Ham above. The aziridines are represented by the formula

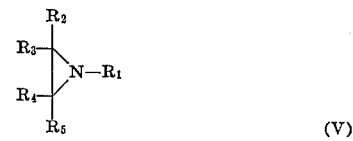

wherein $R_1$ is: hydrogen; alkyl, such as ethyl, propyl, butyl, octyl, dodecyl, octadecyl, and the like; aralkyl, such as benzyl, phenethyl, 2-phenylpropyl, and the like; alkenyl such as allyl, 3-butenyl, and the like; cyano-substituted alkyl, such as cyanoethyl, 2-cyanopropyl, and the like; $R_2$, $R_3$, $R_4$ and $R_5$ are hydrogen or alkyl of from 1 to about 10 carbon atoms and, at least two of $R_2$, $R_3$, $R_4$ and $R_5$ are hydrogen. Preferred aziridine reactants are those wherein $R_2$, $R_3$, and $R_4$ are each hydrogen and $R_5$ is hydrogen or methyl and wherein $R_1$ is hydrogen, ethyl, propyl, butyl, benzyl, phenethyl or allyl, and the most preferred reactant is aziridine (ethylenimine). Examples of suitable such reactants include aziridine (Az), N-ethyl Az, N-butyl Az, N-octyl Az, N-dodecyl Az, N-phenethyl Az, N-allyl Az, N-cyanoethyl Az, and the corresponding N-substituted 2-methylaziridines, 2-ethylaziridines, 2,2-dimethylaziridines, and the like.

Alcohols

Suitable alcohols in the process are those compounds bearing one or more aliphatic alcoholic hydroxyl groups. Examples of suitable such compounds include the alkanols, such as methanol, ethanol, n- and isopropanol, n- and isoamyl alcohol, cyclohexanol, n-decanol, n-octadecanol, and the like; and alkenols, such as allyl alcohol, 1,4-dihydroxy-2-butene; alkynols, such as propargyl alcohol, 1,4-dihydroxy-2-butyne; and aliphatic polyols, such as glycols of from 2 to about 4 carbon atoms, namely ethylene, propylene and butylene glycol, and homopolymers and copolymers thereof, such as polyethylene glycol, polypropylene glycol, etc. which are prepared by condensing an alkylene oxide of from 2 to about 4 carbon atoms onto a compound bearing active hydrogen; glycerol; sorbitol; sugars, such as dextrose, sucrose and lactose; and higher molecular weight polyols, such as starch and flour from corn, potatoes, wheat, soy beans, and the like; cellulose; and polyvinyl alcohol.

The aminoalkylated derivatives of aliphatic polyols, and particularly starch, flour and cellulose, are of particular use as paper additives, such as sizing agents, wet- and dry-strength additives, and the like. Further, the aminoalkylated derivatives of the glycols and polyalkylene glycols are useful as replacements for such glycols in the reaction with conventional diisocyanates to produce strong and durable polyurea-modified polyurethanes.

Ratio of Reactants $SO_2$ and aziridine are included in at least equimolar amounts in the process. Preferably, a molar excess of $SO_2$ is used, such as from 1 to 5 moles of $SO_2$ per mole of aziridine reactant.

The equivalent weight ratio of alcohol to aziridine is suitably at least 1 and is preferably at least 10. In some instances, even larger excesses of alcohol are advantageous. This preference is based on the full utilization of the aziridine reactant.

Process Conditions

For practical purposes, suitable reaction temperatures are selected from about 0° C. to about 150° C. and preferred temperatures are from about 25° C. to about 60° C. At temperatures below about 25° C., however, the reaction rate is low.

The reaction pressure is selected so as to maintain the reaction mixture in a substantially liquid form. Hence, atmospheric and superatmospheric pressures are suitable and autogenous pressure is preferred.

Reaction times of from a few minutes to a few days are suitable, depending upon the reactivity of the particular reactants and the temperature. A reaction time of from about 12 hours to about 6 days is sufficient in most instances for the reaction to go to substantial completion at temperatures of from about 25° to 60° C.

The reaction should be conducted under essentially anhydrous conditions for best results. Water competes with the alcoholic hydroxyl groups in the reaction and thus lowers product yields. Trace amounts of water are acceptable in the process.

SPECIFIC EMBODIMENTS

The following examples further illustrate the invention.

Example 1.—Reaction of aziridine and methanol

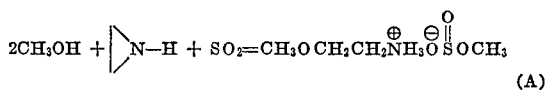

(A)

Step 1: A solution of aziridine (43 g., 1 mole) in 100 g. of methanol was slowly added with stirring to a solution of liquid $SO_2$ (320 g., 5 moles) in 540 g. of methanol at −78° C. in a vessel equipped with stirring means, dropping funnel, condenser and a drying tube; total methanol, 20 moles. The reaction mixture was warmed to room temperature, maintained at room temperature for 144 hours, and filtered. Step 2: Volatiles were removed from the clear, colorless filtrate under reduced pressure at 35° C. leaving a clear viscous residue (196.5 g.). Step 3: This residue was slowly poured into a stirred solution of KOH (168 g.) in 400 ml. of methanol. A white solid ($K_2SO_3$) precipitated and heat was evolved. Step 4: The volatile materials (a product, $H_2O$ and $CH_3OH$) were separated from the slurry of Step 3 using a Büchi evaporator at 100° C. and 20 mm. of pressure and collected in a Dry Ice trap. Step 5: Methanol was removed from the volatiles collected in Step 4 by fractional distillation. The pot residue of this distillation (a Product and $H_2O$) was stored over KOH for 24 hours. Two liquid layers formed and were separated. The top organic layer was distilled to give 35.7 g. of 2-methoxyethylamine, 48% of theory.

2-Methoxyethylamine, as well as the other aminoalkylated alcohols described herein in hte free-amine form, has an amine functionality making it useful as an epoxy curing agent and as an acid scavenger, and other similar known utilities.

Examples 2–6.—Effect of methanol concentration

In a series of experiments performed according to the procedure set forth in Example 1, solutions of aziridine, sulfur dioxide and methanol in a molar ratio of 1:10:variable were held at room temperature for 136 hours and the crude mixture analyzed by nuclear magnetic resonance (NMR) spectroscopy to give the concentration of A. The results were:

TABLE I

| Molar ratio $CH_3OH$/aziridine: | Percent yield* of A |
|---|---|
| 1.9 | 10 |
| 5.0 | 23 |
| 11.1 | 46 |
| 20.0 | 58 |
| 100.0 | 66 |

*Percent yield based on aziridine.

Examples 7–8.—Effect of reaction temperature

In like manner, two solutions containing aziridine, sulfur dioxide and methanol in a molar ratio of 1:10:10 were maintained at different temperatures until the reaction was substantially complete. The results were:

TABLE III

| Temp. (° C.) | Time (hours) | Percent yield of A |
|---|---|---|
| 25 | 136 | 46 |
| 50 | 19 | 26 |

Example 9.—Reaction of aziridine and cellulose

Aziridine (4.3 g., 0.1 mole) was added to 50 ml. of liquid sulfur dioxide and stirred for 1 hour. Wood cellulose (8.1 g.), presoaked in benzene, was added to the complex and the mixture warmed at reflux temperature for 4.5 hours. Carbon tetrachloride (25 ml.) was added and excess sulfur dioxide allowed to evaporate overnight. Carbon tetrachloride (50 ml.) was added and the mixture stirred for 24 hours. The mixture was filtered and the solid washed sequentially with carbon tetrachloride, 5% aqueous HCl, and methanol. Elemental analysis of the dried sample showed (percent): C, 37.6; H, 6.3; N, 3.7; S, 4.0.

The cellulose thus aminoethylated may be used in the same fashion that other aminoalkylated celluloses have been used, e.g. combined with paper pulp and further processed in a conventional manner to a paper having sizing properties.

Example 10.—Reaction of aziridine and starch

Aziridine (4.3 g., 0.1 mole) in 10 ml. of carbon tetrachloride was added to 50 ml. of sulfur dioxide and stirred for 45 minutes. Corn starch (8.1 g.) slurried in 40 ml. of carbon tetrachloride was added to the aziridine-$SO_2$ complex and the mixture refluxed for 6 hours. The sulfur dioxide was allowed to evaporate overnight. The hardened surface of the mixture was broken and the mixture stirred for 38 hours. The solid was isolated by filtration and sequentially washed with methanol, 5% aqueous HCl, and methanol. The dried product contained 5.2% nitrogen, by weight. The starch thus aminoethylated has similar properties and utilities as other aminoethylated starches. It is, therefore, particularly useful as a paper sizing agent and may be used as a flocculant.

In examples 9 and 10, the carbon tetrachloride was included merely for handling convenience. Other inert solvents, such as benzene, could likewise be used.

Example 11.—Reaction of N-ethylaziridine and methanol

N-Ethylaziridine (35.5 g., 0.50 mole) in 120 g. of methanol was slowly added to a stirred solution of $SO_2$ (160 g., 2.5 mole) in 200 g. of methanol at −78° C. The clear, colorless solution was then maintained at room temperature for 137 hours. The volatiles were removed from the mixture under reduced pressure at 35° C. leaving a viscous, colorless residue (100.5 g.) containing ethyl(2-methoxyethyl)amine as a salt; 15% yield.

This residue was poured into a 5N NaOH solution. The mixture was filtered and the filtrate extracted with five 150 ml. portions of ethyl ether. The combined extracts were dried over $Na_2SO_4$ and ethyl(2-methoxyethyl)amine (2.8 g.) recovered therefrom; 6% yield, based on aziridine.

We claim:

1. A process for 2-aminoalkylating an aliphatic alcohol bearing at least one aliphatic alcoholic hydroxyl group comprising reacting by contacting under essentially anhydrous conditions (a) an aliphatic alcohol selected from the group consisting of alkanols, alkenols, alkynols, alkane polyols and polyalkylene glycols, with (b) a basic aziridine corresponding to the formula

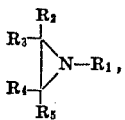

wherein $R_1$ is hydrogen, alkyl, aralkyl, alkenyl, or cyano-substituted alkyl; $R_2$, $R_3$, $R_4$ and $R_5$ are hydrogen or alkyl of from 1 to about 10 carbon atoms and at least two of $R_2$–$R_5$ are hydrogen in the presence of (c) sulfur dioxide; there being initially in the reaction mixture at least one equivalent weight of (a) and at least one mole of (c) per mole of (b); said process being conducted in substantially liquid phase at a temperature of from 0° to 150° C.

2. The process defined in Claim 1 wherein said temperature is from 25° C. to 60° C.

3. The process defined in Claim 1 wherein the ratio of (a):(b) is at least 10.

4. The process defined in Claim 1 wherein (a) is an alkanol of from 1 to 18 carbon atoms.

5. The process defined in Claim 1 wherein the reaction product is further reacted with aqueous caustic and the 2-aminoalkylated product recovered.

6. The process defined by Claim 1 wherein $R_1$ is hydrogen, alkyl of up to 18 carbon atoms, benzyl, phenethyl, phenylpropyl, allyl, butenyl, 2-cyanoethyl, or 2-cyanopropyl; and $R_2$–$R_5$ are each independently hydrogen, methyl or ethyl.

7. The process defined in Claim 6 wherein $R_1$ is hydrogen, ethyl, propyl, butyl, benzyl, phenethyl or allyl and $R_2$, $R_3$ and $R_4$ are each hydrogen and $R_5$ is hydrogen or methyl.

8. The process defined in Claim 6 wherein (a) is an alkanol of up to 18 carbon atoms, allyl alcohol, 1,4-dihydroxy-2-butene, propargyl alcohol, 1,4-dihydroxy-2-butyne, alkylene glycol of 2 to 4 carbon atoms, polyethylene glycol, polypropylene glycol, polybutylene glycol, glycerol, sorbitol or polyvinyl alcohol.

9. The process defined in Claim 1 wherein (a) is methanol and (b) is ethylenimine or N-ethylethylenimine; and wherein the equivalent ratio of (a) to (b) is at least 10.

10. The process defined in Claim 9 wherein (b) is ethylenimine.

References Cited
UNITED STATES PATENTS

| | | | |
|---|---|---|---|
| 2,876,263 | 3/1959 | Mark | 260—459 A |
| 3,168,546 | 2/1965 | Ballauf et al. | 260—456 A |
| 3,463,784 | 8/1969 | Doyle et al. | 260—456 A X |

OTHER REFERENCES

Dermer et al., "Ethylenimine and Other Aziridines," 1969, pp. 222–226.

JOSEPH E. EVANS, Primary Examiner

U.S. Cl. X.R.

162—177; 260—77.5 AQ, 212, 215, 233.3 R, 465 E, 465.5 R, 570.6, 584 C